United States Patent [19]

Langer

[11] Patent Number: 5,250,269
[45] Date of Patent: Oct. 5, 1993

[54] CATALYTIC CONVERTER HAVING A METALLIC MONOLITH MOUNTED BY A HEAT-INSULATING MAT OF REFRACTORY CERAMIC FIBERS

[75] Inventor: Roger L. Langer, Hudson, Wis.

[73] Assignee: Minnesota Mining and Manufacturing Company, St. Paul, Minn.

[21] Appl. No.: 887,523

[22] Filed: May 21, 1992

[51] Int. Cl.$^5$ .................... B01D 50/00; B01D 53/34
[52] U.S. Cl. .................... 422/179; 422/180; 422/221
[58] Field of Search ............... 422/179, 171, 172, 180, 422/221; 502/304, 302

[56] References Cited

U.S. PATENT DOCUMENTS

| | | | |
|---|---|---|---|
| 4,055,434 | 10/1977 | Chen et al. | 106/50 |
| 4,305,992 | 12/1981 | Langer et al. | 428/324 |
| 4,312,911 | 1/1982 | Smith et al. | 428/224 |
| 4,693,338 | 9/1987 | Clere | 181/231 |
| 4,863,700 | 9/1989 | Ten Eyck | 422/179 |
| 4,929,429 | 5/1990 | Merry | 422/179 |
| 5,024,289 | 6/1991 | Merry | 181/231 |
| 5,028,397 | 7/1991 | Merry | 422/179 |

FOREIGN PATENT DOCUMENTS 1481133  7/1977  United Kingdom .

Primary Examiner—James C. Housel
Assistant Examiner—Krisanne M. Thornton
Attorney, Agent, or Firm—Gary L. Griswold; Walter N. Kirn; Jeffrey L. Wendt

[57] ABSTRACT

A catalytic converter has a metallic monolith that is mounted in a canister by a heat-insulating mat of melt-formed refractory ceramic fibers that have been annealed to provide a Resiliency Value of at least 10 kPa. A mat having such Resiliency Value does not take a compression set that would allow the monolith to become loose. The ceramic fibers preferably are melt-formed from a mixture of about equal parts by weight of $Al_2O_3$ and $SiO_2$. After being annealed, the ceramic fibers can have a fine-grained crystalline structure, but significant energy savings can be realized by reducing the annealing temperatures and times such that the fibers have an amorphous structure while still attaining excellent Resiliency Values.

13 Claims, 1 Drawing Sheet

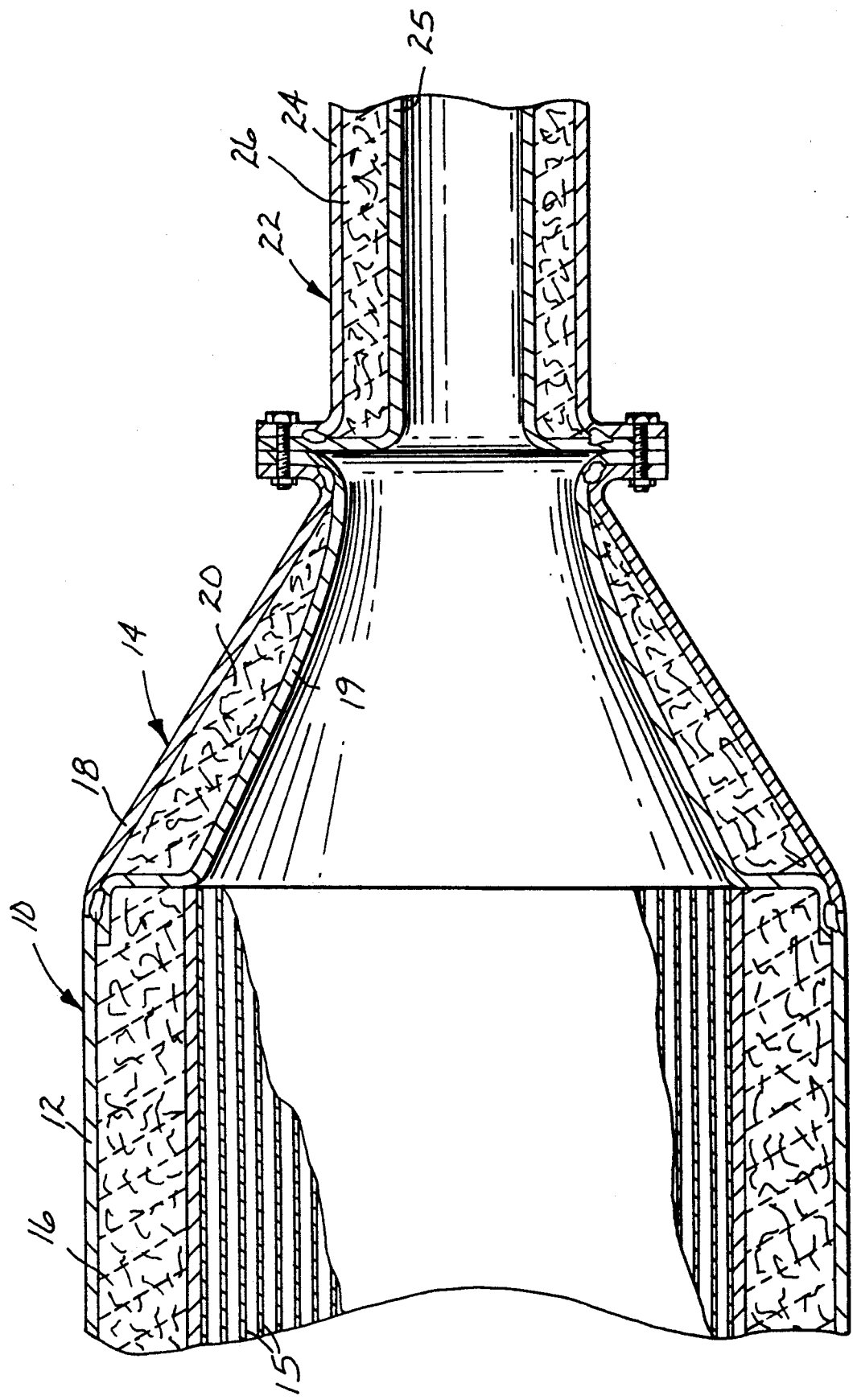

CATALYTIC CONVERTER HAVING A METALLIC MONOLITH MOUNTED BY A HEAT-INSULATING MAT OF REFRACTORY CERAMIC FIBERS

BACKGROUND OF THE INVENTION

1. Field of the Invention

The invention concerns a catalytic converter which has a metallic monolith that is mounted by a heat-insulating blanket or mat of refractory ceramic fibers. More generally, the invention is concerned with any device that has a canister containing a metallic member and a heat-insulating blanket between the metallic member and the canister.

2. Description of the Related Art

A catalytic converter typically has a metallic or ceramic monolith which is mounted within a metal canister by a heat-insulating blanket. The blanket typically is a mat of refractory ceramic fibers. In use, the monolith is heated to temperatures on the order of 600°–1000° C. while the heat-insulating mat keeps the canister at much lower temperatures. This temperature differential causes a metallic monolith to expand more than the canister, thus narrowing the gap between the monolith and the canister and compressing the heat-insulating mat. Unless the mat is resilient, it can take such a compression set that the metallic monolith becomes loose when the catalytic converter cools. This would not only reduce the heat-insulating value of the mat, but in vehicular use, a loose monolith would produce annoying noises and by being buffeted would be subject to premature failure.

In addition to catalytic converters, there are other devices wherein a canister or other housing contains a metallic member that becomes hot and must be insulated from the housing by a blanket or mat of refractory ceramic fibers, e.g., a diesel particulate trap, an insulated end-cone, or an insulated doublewalled exhaust pipe such as that of coassigned U.S. Pat. No. 5,024,289 (Merry). Any such heat-insulating blanket or mat should be sufficiently resilient that it does not become loose by taking a compression set when the inner metallic member expands in use to narrow the gap between the inner metallic member and its housing.

A mat of refractory ceramic fibers that has sufficient resiliency to prevent a metallic monolith from becoming too loose is disclosed in coassigned U.S. Pat. Nos. 4,929,429 and 5,028,397 (both Merry). The refractory ceramic fibers used in the mat of the Merry patents can be made from an aqueous solution or a colloidal dispersion that is called an "organosol" or a "sol gel". The Merry patents say that substantially shot-free ceramic fibers, formed by sol gel processes, offer the high degree of resiliency needed for mounting metallic monoliths, but that conventional ceramic fibers formed by melt processes contain shot particles and are not suitable. Comparative examples of the Merry patents show that even when melt-formed ceramic fibers have been treated to reduce the shot content to as low as 5%, they still lack the requisite resiliency. Untreated melt-formed ceramic fibers typically have shot contents within the range of 30 to 60%.

Refractory ceramic fibers formed by sol gel processes can be either crystalline or amorphous, depending upon the temperature at which they are fired. Those formed by conventional melt processes are initially amorphous. UK Pat. Spec. No. 1,481,133 (Johnson et. al.) says that a blanket of amorphous ceramic fibers will retain a substantially permanent set under compression, but that good resiliency can be achieved by converting from an amorphous form to a fine-grained crystalline form. This can be achieved by heating above the devitrification temperature of about 950° C., while avoiding higher temperatures (above about 1050° C.) that would result in a coarse-grained structure. We fail to find any indication of use in the Johnson patent specification, but as of its original filing date (1974), mats or blankets of refractory ceramic fibers were. commonly used as furnace liners.

U.S. Pat. No. 4,312,911 (Smith et. al.) concerns fibers of a refractory compound selected from the group consisting of silica, alumina, aluminum silicate, titania, titanium silicate, zirconia, zirconium silicate and mixtures thereof, which fibers can be either amorphous or microcrystalline. The Smith patent specifically concerns improving the heat and shrink resistance of such fibers (and of articles such as mats made from the fibers) by coating them with $Cr_2O_3$. The shrink resistance can be further improved by pretreating the fibers at a temperature between about 1150° C. and 1350° C. for from 1 to about 10 minutes.

U.S. Pat. No. 4,055,434 (Chen et. al.) concerns fibers made from a melt of relatively pure alumina and silica plus from 3 to 16% by weight of either burnt dolomite or calcium oxide and magnesium oxide.

SUMMARY OF THE INVENTION

The invention provides a catalytic converter which, like those of the Merry '429 and '397 patents, has a monolith that is mounted in a canister by a heat-insulating mat of refractory ceramic fibers. The catalytic converter of the invention differs from that of the Merry patents in that refractory ceramic fibers of its heat-insulating mat are melt-formed and have been annealed at a temperature and for a time sufficient to provide a Resiliency Value (as defined below) of at least 10 kPa. By having such a Resiliency Value, a metallic monolith should not become loose after the heat-insulating mat has been compressed by the thermal expansion of a metallic monolith within a canister of a catalytic converter.

More broadly, a heat-insulating mat of annealed melt-formed refractory ceramic fibers can be employed to insulate any inner metallic member that becomes hot in use and expands to compress the mat between the metallic member and a housing.

The melt-formed refractory ceramic fibers of the heat-insulating mat can be annealed to develop a fine-grained crystalline form (as in the Johnson UK Pat. Spec.) while avoiding higher temperatures that would result in a coarse-grained structure and consequently result in an unsatisfactory Resiliency Value. However, by restricting the annealing temperature and time such that the melt-formed fibers remain substantially amorphous, there is a significant energy saving as compared to Johnson's need to develop a crystalline structure.

By "substantially amorphous" is meant that no crystallinity can be detected by x-ray diffraction, even though microcrystallinity has been detected in some cases by transmission electron microscopy (TEM). In experimentation to date, differential thermal analysis (DTA) shows that melt-formed refractory ceramic fibers devitrify when the annealing temperature is raised to about 990° C. X-ray diffraction shows crystallinity in those devitrified fibers, but not in identical fibers that have been annealed at temperatures lower than 990° C.

The effectiveness of a heat-insulating mat of melt-formed refractory ceramic fibers that are substantially amorphous is surprising in view of the need in the Johnson UK Pat. Spec. to convert such fibers to a fine-grained crystalline form.

In view of statements in the Merry '429 and '397 patents, it is surprising that there is no need to go to the expense of treating the heat-insulating mat or its melt-formed refractory ceramic fibers to reduce or substantially eliminate shot. Good results in mounting metallic monoliths in canisters of catalytic converters have been achieved when shot comprised up to about 60% by weight of the heat-insulating mat. However, lower levels of shot are preferred when available at equivalent costs.

The heat-insulating mat preferably is free from materials other than annealed, melt-formed refractory ceramic fibers and preferably has only a minor proportion of binder that provides sufficient integrity to the mat to enable it to be handled and wrapped or stuffed into position in the manufacture of the device of the invention. The binder can be removed chemically after the mat is in place, or it can be burned off by the heat of the first use of the device. In the latter event, the burning binder should not emit any hazardous volatiles.

A binder can be avoided by wet-laying the fibers to align most of the fibers in the plane of the heat-insulating mat, but such a mat can be difficult to handle.

The heat-insulating mat can contain additional fibers, flakes and other materials that are heat-insulating as long as they are used in proportions that do not reduce the Resiliency Value to less than 10 kPa. In addition to or instead of being contained within the heat-insulating mat, such other materials can form a separate layer similar to the intumescent sheet material of FIG. 3 of the Merry '429 patent. Such additional materials include unexpanded vermiculite flakes and other materials listed at col. 3, lines 28–48 of Merry '429.

A useful heat-insulating mat can be made from about 1 to 70% by weight of intumescent material, about 10 to 70% by weight of annealed melt-formed refractory ceramic fibers, and about 3 to 20% by weight of binder.

The melt-formed refractory ceramic fibers can be melt-blown or melt-spun from a variety of metal oxides, preferably a mixture of $Al_2O_3$ and $SiO_2$ having from 30 to 70% by weight of alumina and from 70 to 30% by weight of silica, preferably about equal parts by weight. The mixture can include other oxides such as $B_2O_3$, $P_2O_5$, and $ZrO_2$.

Melt-formed refractory ceramic fibers that can be used to make the heat-insulating mat are available from a number of commercial sources and include these known under the trade designation "Fiberfrax" from Carborundum Co., Niagara Falls, NY; "Cerafiber" and "Kaowool" from Thermal Ceramics Co., Augusta, GA; "Cer-wool" from Premier Refractories Co., Erwin, TN; and "SNSC" from Shin-Nippon Steel Chemical of Tokyo, Japan. The manufacturer of ceramic fibers known under the trade designation "Cer-wool" states that they are melt-spun from a mixture of by weight 48% silica and 52% alumina and have an average fiber diameter of 3–4 micrometers. The manufacturer of ceramic fibers known under the trade designation "Cerafiber" states that they are meltspun from a mixture of by weight 54% silica and 46% alumina and have an average fiber diameter of 2.5–3.5 micrometers. The manufacturer of ceramic fibers "SNSC 1260-D1" states that they are melt-formed from a mixture of by weight 54% silica and 46% alumina and have an average fiber diameter of about 2 micrometers.

The individual ceramic fibers of the heat-insulating mat preferably are from 2 to 8 micrometers in diameter. If they were of substantially larger diameter, the mat would be more fragile and would require substantially more binder to afford adequate handlability. It is difficult to melt-form refractory ceramic fibers at diameters smaller than 2 micrometers or larger than 8 micrometers.

BRIEF DESCRIPTION OF THE DRAWING

The single figure of the drawing is a schematic central cross-section through a portion of an automotive exhaust system. Shown is a fragment of a catalytic converter that has a pair of insulated end cones, one of which is shown attached to an insulated exhaust pipe. Each of the catalytic converter, insulated end cone, and insulated exhaust pipe incorporates a mat of refractory ceramic fibers according to the invention.

DESCRIPTION OF THE PREFERRED EMBODIMENTS

In the drawing, a catalytic converter 10 includes a metallic casing having a cylindrical canister 12 that has been welded to a pair of insulated end cones of which only the inlet end cone 14 is shown. A metallic monolith 15 is mounted in the cylindrical canister 12 by a mat 16 of annealed refractory ceramic fibers. Each of the inlet and outlet end cones has an outer metal wall 18 and an inner metal wall 19, between which is a space filled with a mat 20 of annealed, melt-formed refractory ceramic fibers. At its opening, the inlet end cone 14 is bolted to an insulated exhaust pipe 22 that has an outer metal wall 24, and an inner metal wall 25, between which is a space filled with a mat 26 of annealed, melt-formed refractory ceramic fibers.

TESTING

Resiliency Test

A heat-insulating mat can be tested for Resiliency Value by being made to have a weight/area of 1610 $g/m^2$. A 2.5-cm disk of the mat is placed between two steel anvils at room temperature (R.T.). The anvils are closed to a 4.24 mm gap, and the pressure is recorded. The anvils are then heated so that the top anvil is at 800° C. and the bottom anvil is at 430° C. while simultaneously reducing the gap to 3.99 mm. After recording the pressure, the heaters are shut off, allowing both anvils to cool back to room temperature while adjusting the gap back to the original 4.24 mm, thus simulating conditions to which a mat is subjected when used to mount a metallic monolith in a catalytic converter. A recorded pressure, which is the Resiliency Value of the test mat, of at least 10 kPa indicates that the tested mat should have sufficient resiliency to be used for mounting a metallic monolith in a canister of a catalytic converter. By having such resiliency, the mat should keep a metallic monolith securely in place in a catalytic converter. The Resiliency Value preferably is at least 20 kPa, more preferably at least 50 kPa, to provide greater assurance that a metallic monolith will not become loose during the projected useful life of a catalytic converter.

Hot-shake Test

A heat-insulating mat is used to mount in the canister of a catalytic converter a metallic monolith that is 9 cm in diameter and 7.6 cm in length. Exhaust gases are passed through the converter while simultaneously subjecting it to mechanical vibration to simulate vibrations that would be encountered in vehicular use. Using an electromechanical vibrator made by Unholtz-Dickie Corp, an acceleration of 40 g's at 100 Hz frequency is applied to the converter. The heat source is a natural gas burner that supplies to the converter an inlet gas temperature of 800° C. The gas temperature is cycled in order to test the ability of the mounting mat to maintain its resiliency and corresponding holding force while the space it occupies is changing dimensions. One cycle consists of 10 minutes at 800° C. and 10 minutes with the gas burner shut off. Vibration is maintained throughout the test. The duration of the test is 20 cycles if there is no earlier failure.

In each of the examples, all parts are given by weight.

EXAMPLES 1–5

A number of commercially available refractory ceramic fibers were formed into mats by conventional wet-laid paper making. The mats were annealed in a muffle furnace as indicated in Table I, except that the fibers of Examples 2A, 4A, and 4B were annealed before being formed into a mat. Table I also indicates approximate shot contents. Before being annealed, the fibers of those mats of Table I with shot contents below 45% had been treated to reduce their shot content. Each mat had a weight/area of 1610 g/m² and contained about 5% organic binder before being annealed.

The three right-hand columns of Table I report results of the above-described "Resiliency Test", and the far right-hand column reports "Resiliency Values" obtained after both anvils had been returned to room temperature and the gap had been returned to 4.24 mm.

Table I also reports testing of mats of the same commercially available fibers that were not annealed and are called Comparative Examples 1X, 2X, 3X, 4X and 5X. As indicated by x-ray diffraction, the fibers of all of the mats of Table I were amorphous. TEM showed that the ceramic fibers known by the trade designation "Cerafiber" of Example 4C had some microcrystallinity, but was not used to test fibers of the other examples. TEM showed that when fibers known by the trade designation "Cer-wool" HP (57% shot content) were annealed at 900° C. for 72 hours, only a few of the fibers contained microcrystallinity whereas a majority of the fibers were amorphous.

TABLE I

| Example | Shot content (%) | Annealing temp. (°C.) | Annealing time (min) | Pressure (kPa) when R.T./R.T. 4.24 mm gap | Pressure (kPa) when 800° C./430° C. 3.99 mm gap | Pressure (kPa) when R.T./R.T. 4.24 mm gap |
|---|---|---|---|---|---|---|
| 1A "Cer-wool" HP | 33 | 950 | 120 | 144.8 | 155.1 | 65.5 |
| 1B "Cer-wool" HP | 33 | 900 | 120 | NT | NT | NT |
| 1X "Cer-wool" HP | 33 | none | | 137.9 | 34.5 | 6.9 |
| 2A "Cer-wool" HP | 45 | 700 | 8 | 227.5 | 69.0 | 20.7 |
| 2B "Cer-wool" HP | 45 | 800 | 120 | 134.5 | 137.9 | 51.7 |
| 2C "Cer-wool" HP | 45 | 970 | 300 | 89.5 | 131.0 | 51.7 |
| 2X "Cer-wool" HP | 45 | none | | 29.0 | 11.7 | 0 |
| 3A "Cer-wool" HP | 57 | 800 | 120 | 34.5 | 58.0 | 23.0 |
| 3B "Cer-wool" HP | 57 | 970 | 300 | 42.1 | 63.4 | 25.3 |
| 3X "Cer-wool" HP | 57 | none | | 15.9 | 5.9 | 0 |
| 4A "Cerafiber" VFS | 33 | 700 | 8 | 172.5 | 64.0 | 27.6 |
| 4B "Cerafiber" VFS | 33 | 950 | 120 | 117.3 | 120.8 | 41.4 |
| 4C "Cerafiber" VFS | 33 | 800 | 120 | NT | NT | NT |
| 4X "Cerafiber" VFS | 33 | none | | 75.8 | 27.6 | 0 |
| 5A "SNSC" 1260 D-1 | 6 | 950 | 120 | 158.6 | 103.4 | 48.3 |
| 5X "SNSC" 1260 D-1 | 6 | none | | 158.6 | 55.2 | 6.9 |

NT = not tested

As reported in Table I, the mats of each of Examples 1–5 had Resiliency Values greater than 20 kPa, whereas those of each of the Comparative Example were less than 10 kPa.

Portions of some of the mats of Table I were subjected to the above described Hot-shake Test at mount densities indicated in Table II.

TABLE II

| Example | Shot content (%) | Annealing temp. (°C.) | Annealing time (min) | Mount Density (g/m³) | Results (Hot-shake Test) |
|---|---|---|---|---|---|
| 1B "Cer-wool" HP | 33 | 900 | 120 | 0.43 | Fail 18 cycles |
| 1X "Cer-wool" HP | 33 | none | | 0.62 | Fail 1 cycle |
| 2A "Cer-wool" HP | 45 | 700 | 8 | 0.62 | Fail 9 cycles |
| 4A "Cerafiber" VFS | 33 | 700 | 8 | 0.43 | Pass 20 cycles |
| 4C "Cerafiber" VFS | 33 | 800 | 120 | 0.38 | Fail 6 cycles |
| 4C "Cerafiber" VFS | 33 | 800 | 120 | 0.57 | Pass 20 cycles |
| 4X "Cerafiber" VFS | 33 | none | | 0.78 | Fail 1 cycle |

A mat at higher mount density normally provides a higher holding force and (consistent with a comparison between the two mount densities of 4C) allows a mat to withstand a larger number of cycles in the Hot-shake Test. In spite of the relatively high mount density of Comparative Examples 1X and 4X, each failed in the first cycle of the Hot-shake Test.

What is claimed is:

1. A catalytic converter comprising a monolith mounted in a canister by a heat-insulating mat which primarily comprises substantially amorphous melt-formed refractory ceramic fibers that have been annealed under conditons sufficient to provide a Resiliency Value of at least 10 kPa.

2. A catalytic converter as defined in claim 1 wherein the refractory ceramic fibers have been annealed at a temperature of at least 700° C. and less than 990° C.

3. A catalytic converter as defined in claim 1 wherein the refractory ceramic fibers comprise up to 60% by weight of shot.

4. A catalytic converter as defined in claim 1 wherein the refractory ceramic fibers comprise from 30 to 70% by weight of alumina and from 70 to 30% by weight of silica.

5. A catalytic converter as defined in claim 4 wherein the refractory ceramic fibers comprise about equal parts by weight of alumina and silica.

6. A catalytic converter as defined in claim 1 wherein the refractory ceramic fibers are from 2 to 8 micrometers in diameter.

7. A catalytic converter as defined in claim 1, the heat-insulating mat of which contains additional heat-insulating materials selected from fibers and flakes.

8. A catalytic converter as defined in claim 7 wherein said additional heat-insulating materials form a separate layer.

9. A catalytic converter as defined in claim 7 wherein said additional heat-insulating materials comprise intumescent material.

10. A catalytic converter as defined in claim 9 wherein said intumescent material comprises unexpanded vermiculite flakes.

11. A device comprising a housing containing an inner metallic member that is insulated from the housing by a mat heat-insulating of ceramic fibers, which metallic member becomes hot in use and expands to compress the mat between the metallic member and the housing, said device being characterized by the feature that:

the mat primarily comprises substantiallyu aorphous melt-formed refractory ceramic fibers that have been annealed under conditions sufficient to provide a Resiliency Value of at least 10 kPa.

12. The device as defined in claim 11 wherein the refractory ceramic fibers of the heat-insulating mat have been annealed at a temperature of at least 700° C. and less than 990° C.

13. A catalytic converter comprising a metallic momolith mounted in a canister by a heat-insulating mat which primarily comprises substantially amorphous melt-formed refractory ceramic fibers that have been annealed under conditions sufficient to provide a Resiliency Value of at least 10 kPa.

* * * * *